(12) United States Patent
Sawafuji

(10) Patent No.: US 11,249,108 B2
(45) Date of Patent: Feb. 15, 2022

(54) ROAD SURFACE INFORMATION COLLECTION DEVICE

(71) Applicant: PACIFIC INDUSTRIAL CO., LTD., Ogaki (JP)

(72) Inventor: Kazunori Sawafuji, Ogaki (JP)

(73) Assignee: PACIFIC INDUSTRIAL CO., LTD., Ogaki (JP)

( * ) Notice: Subject to any disclaimer, the term of this patent is extended or adjusted under 35 U.S.C. 154(b) by 333 days.

(21) Appl. No.: 16/610,210

(22) PCT Filed: Nov. 30, 2018

(86) PCT No.: PCT/JP2018/044248
§ 371 (c)(1),
(2) Date: Nov. 1, 2019

(87) PCT Pub. No.: WO2020/110304
PCT Pub. Date: Jun. 4, 2020

(65) Prior Publication Data
US 2020/0278378 A1    Sep. 3, 2020

(51) Int. Cl.
*G01P 15/18* (2013.01)
*B60C 19/00* (2006.01)
(Continued)

(52) U.S. Cl.
CPC .............. *G01P 15/18* (2013.01); *B60C 19/00* (2013.01); *B60R 16/0231* (2013.01); *G01P 3/44* (2013.01); *B60C 2019/004* (2013.01)

(58) Field of Classification Search
None
See application file for complete search history.

(56) References Cited

U.S. PATENT DOCUMENTS 5,373,446 A * 12/1994 Mizukoshi ........... B60K 31/047
303/172
7,668,645 B2 * 2/2010 Lu ......................... B60W 30/04
701/124
(Continued)

FOREIGN PATENT DOCUMENTS

DE   102007039242 A1   2/2009
JP   2005-321958 A   11/2005
(Continued)

OTHER PUBLICATIONS

Jan. 22, 2019 International Search Report issued in International Patent Application No. PCT/JP2018/044248.
(Continued)

*Primary Examiner* — Andre J Allen
*Assistant Examiner* — Jermaine L Jenkins
(74) *Attorney, Agent, or Firm* — Oliff PLC

(57) ABSTRACT

A road surface information collection device includes a first sampling unit that samples acceleration sensor's detection results with a first sampling cycle to obtain first sampling data, a position calculator that calculates an acceleration sensor's rotational position based on changes in first sampling data, a second sampling unit that is activated based on a condition that the acceleration sensor is positioned within a first predetermined range including a back side of a point on the tire in contact with the ground, and that samples detection results of the acceleration sensor with a second sampling cycle shorter than first sampling cycle to obtain second sampling data as the road surface information, a speed calculator that detects a rotation speed of the tire based on changes in the first sampling data, and a first predetermined range determination unit that changes the first predetermined range in accordance with the rotation speed of tire.

20 Claims, 14 Drawing Sheets

(51) Int. Cl.
*B60R 16/023* (2006.01)
*G01P 3/44* (2006.01)

(56) References Cited

U.S. PATENT DOCUMENTS

| | | | |
|---|---|---|---|
| 7,983,875 B2* | 7/2011 | Duret | B60T 8/171 |
| | | | 702/182 |
| 2005/0248446 A1 | 11/2005 | Watabe et al. | |
| 2007/0084276 A1 | 4/2007 | Matsuda et al. | |
| 2008/0125948 A1 | 5/2008 | Matsuda et al. | |
| 2010/0024538 A1 | 2/2010 | Hammerschmidt | |
| 2010/0294032 A1 | 11/2010 | Pannek et al. | |
| 2015/0142259 A1 | 5/2015 | Mori et al. | |
| 2018/0222458 A1 | 8/2018 | Suzuki et al. | |
| 2018/0244116 A1 | 8/2018 | Zhuk | |

FOREIGN PATENT DOCUMENTS

| | | |
|---|---|---|
| JP | 2006-182253 A | 7/2006 |
| JP | 2007-055284 A | 3/2007 |
| JP | 2007-121274 A | 5/2007 |
| JP | 2008-126942 A | 6/2008 |
| JP | 2010-536638 A | 12/2010 |
| JP | 2017-081380 A | 5/2017 |
| JP | 2018-184157 A | 11/2018 |
| WO | 2013/187016 A1 | 12/2013 |

OTHER PUBLICATIONS

Jan. 22, 2019 Written Opinion of the International Searching Authority issued in International Patent Application No. PCT/JP2018/044248.

Jun. 25, 2020 Extended European Search Report issued in European Patent Application No. 18917036.8.

* cited by examiner

FIG. 4

| | $0 < \omega < \pi$ | $\pi \leq \omega < 2\pi$ | $2\pi \leq \omega < 3\pi$ | | $15\pi \leq \omega < 20\pi$ | $20\pi \leq \omega \leq 25\pi$ |
|---|---|---|---|---|---|---|
| $\omega$ [rad/s] | | | | | | |
| VEHICLE SPEED V [km/h] | $0 < v < 4$ | $4 \leq v < 8$ | $8 \leq v < 12$ | | $60 \leq v < 80$ | $80 \leq v < 100$ |
| CYCLE OF ONE ROTATION T1 [s] | 2~ | 1~2 | 0.6~1 | | 0.1~0.13 | 0.08~0.13 |
| FIRST SAMPLING CYCLE S1 [s] | 0.083 | 0.042 | 0.025 | | 0.004 | 0.003 |
| SECOND SAMPLING CYCLE S2 [s] | | | | $1.0 \times 10^{-6}$ | | |
| NUMBER OF SAMPLE DATE SETS N1 WHEN IN CONTACT WITH GROUND | $7 \times 10^3$ | $3.5 \times 10^3$ | $2 \times 10^3$ | | $0.3 \times 10^3$ | $0.25 \times 10^3$ |

FIG. 8

| $\omega$ [rad/s] | $0<\omega<\pi$ | $\pi\leqq\omega<2\pi$ | $2\pi\leqq\omega<3\pi$ | ... | $15\pi\leqq\omega<20\pi$ | $20\pi\leqq\omega\leqq25\pi$ |
|---|---|---|---|---|---|---|
| VEHICLE SPEED V [km/h] | $0<v<4$ | $4\leqq v<8$ | $8\leqq v<12$ | ... | $60\leqq v<80$ | $80\leqq v<100$ |
| CYCLE OF ONE ROTATION T1 [s] | $2\sim$ | $1\sim2$ | $0.6\sim1$ | ... | $0.1\sim0.13$ | $0.08\sim0.13$ |
| FIRST SAMPLING CYCLE S1 [s] | 0.083 | 0.042 | 0.025 | ... | 0.004 | 0.003 |
| SECOND SAMPLING CYCLE S2 [s] | | $1.0\times10^{-6}$ | | ... | $0.1\times10^{-6}$ | |
| NUMBER OF SAMPLE DATE SETS N1 WHEN IN CONTACT WITH GROUND | $7\times10^{3}$ | $3.5\times10^{3}$ | $2\times10^{3}$ | ... | $3.0\times10^{3}$ | $2.5\times10^{3}$ |

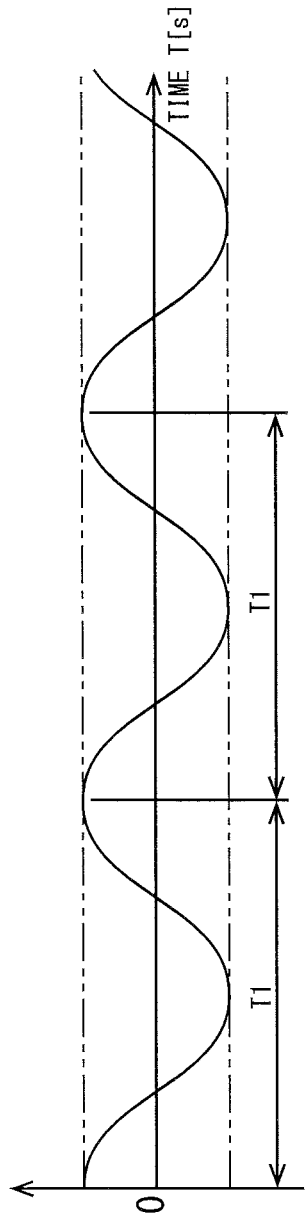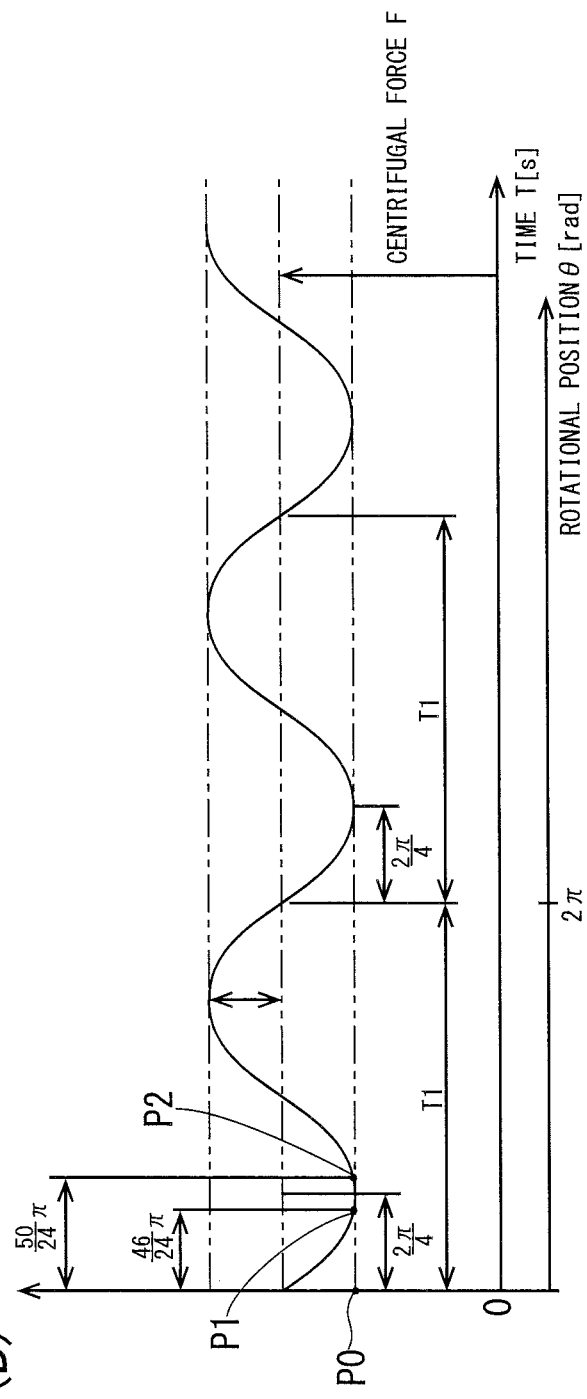
FIG. 10 (A) OUTPUT OF Y-AXIS ACCELERATION SENSOR
FIG. 10 (B) OUTPUT OF X-AXIS ACCELERATION SENSOR

ROAD SURFACE INFORMATION COLLECTION DEVICE

TECHNICAL FIELD

The present disclosure relates to a road surface information collection device that collects road surface information during drive of a vehicle.

BACKGROUND ART

In the past, there have been known road surface information collection devices of this sort that include acceleration sensors attached to the inner circumferential surfaces of tires to collect road surface information based on vibration and shock detected by the acceleration sensors (see, for example, Patent Document 1).

RELATED ART DOCUMENTS

Patent Documents

Patent Document 1: Japanese Unexamined Patent Application Publication No. JP 2007-55284A (paragraphs [0002], [0003], [0018])

DISCLOSURE OF THE INVENTION

Problems to be Solved by the Invention

However, the conventional road surface information collection device consumes battery fast and therefore development of technologies that enable reduction of power consumption is called for.

Means of Solving the Problems

A road surface information collection device according to one aspect of the present disclosure made to solve the problem described above collects road surface information with an acceleration sensor attached to an inner circumferential surface of a tire of a vehicle. The device includes: a first sampling unit that samples detection results of the acceleration sensor with a first sampling cycle to obtain first sampling data; a position calculator that calculates a rotational position of the acceleration sensor based on changes in the first sampling data; a second sampling unit that is activated based on a condition that the acceleration sensor is positioned within a first predetermined range including a back side of a point on the tire in contact with the ground, and that samples detection results of the acceleration sensor with a second sampling cycle shorter than the first sampling cycle to obtain second sampling data as the road surface information; a speed calculator that detects a rotation speed of the tire based on changes in the first sampling data; and a first predetermined range determination unit that changes the first predetermined range in accordance with the rotation speed of the tire.

BRIEF DESCRIPTION OF THE DRAWINGS

FIG. 4 is a table showing correspondence between angular velocities of a tire and first sampling cycles.
FIG. 8 is a table showing correspondence between angular velocities of a tire and first and second sampling cycles.
FIG. 10 is a graph showing changes in sensing voltage of an acceleration sensor.

MODE FOR CARRYING OUT THE INVENTION

First Embodiment

Figure 1:
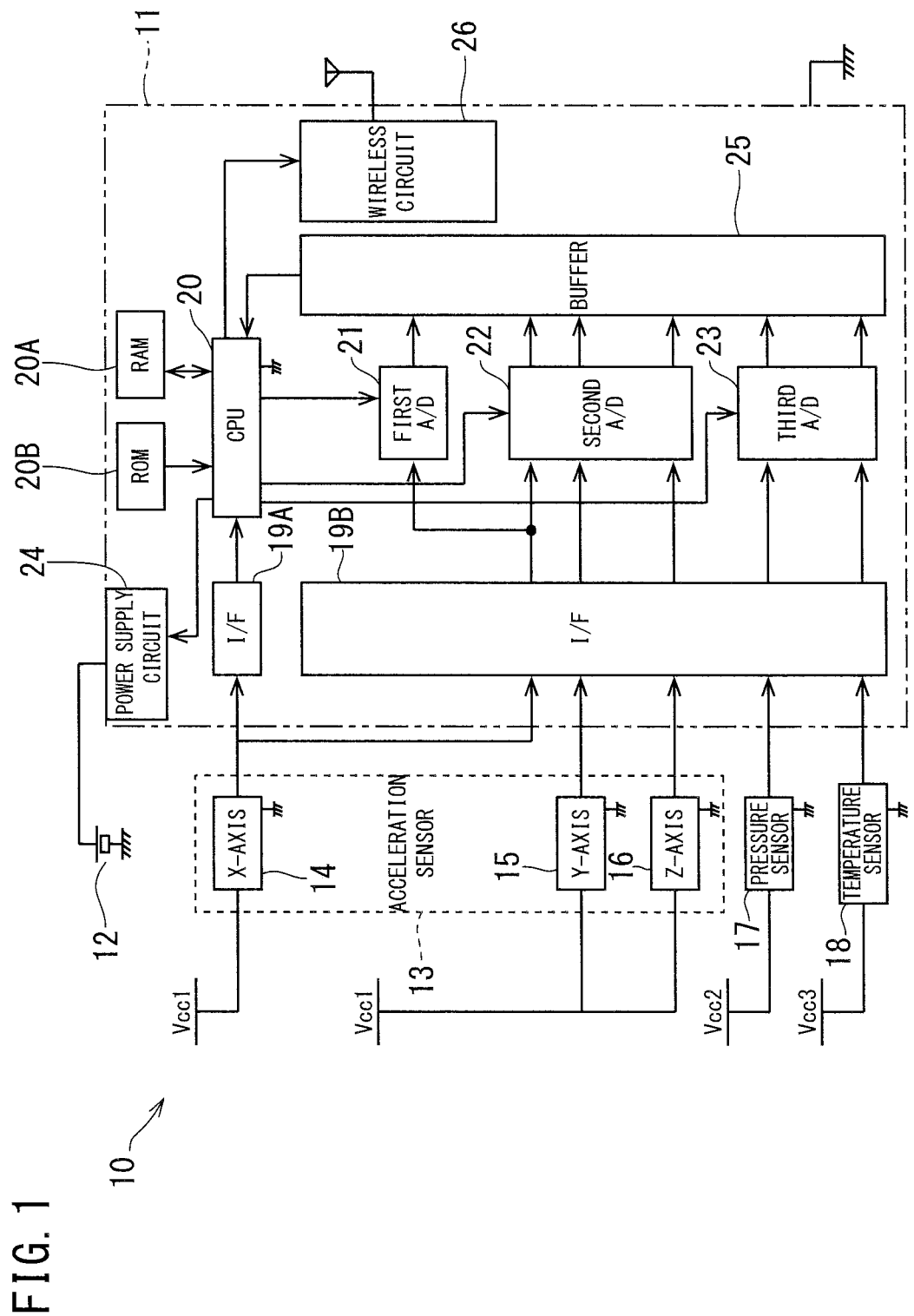
FIG. 1 is a circuit diagram of a road surface information collection device of a first embodiment.
Figure 2:
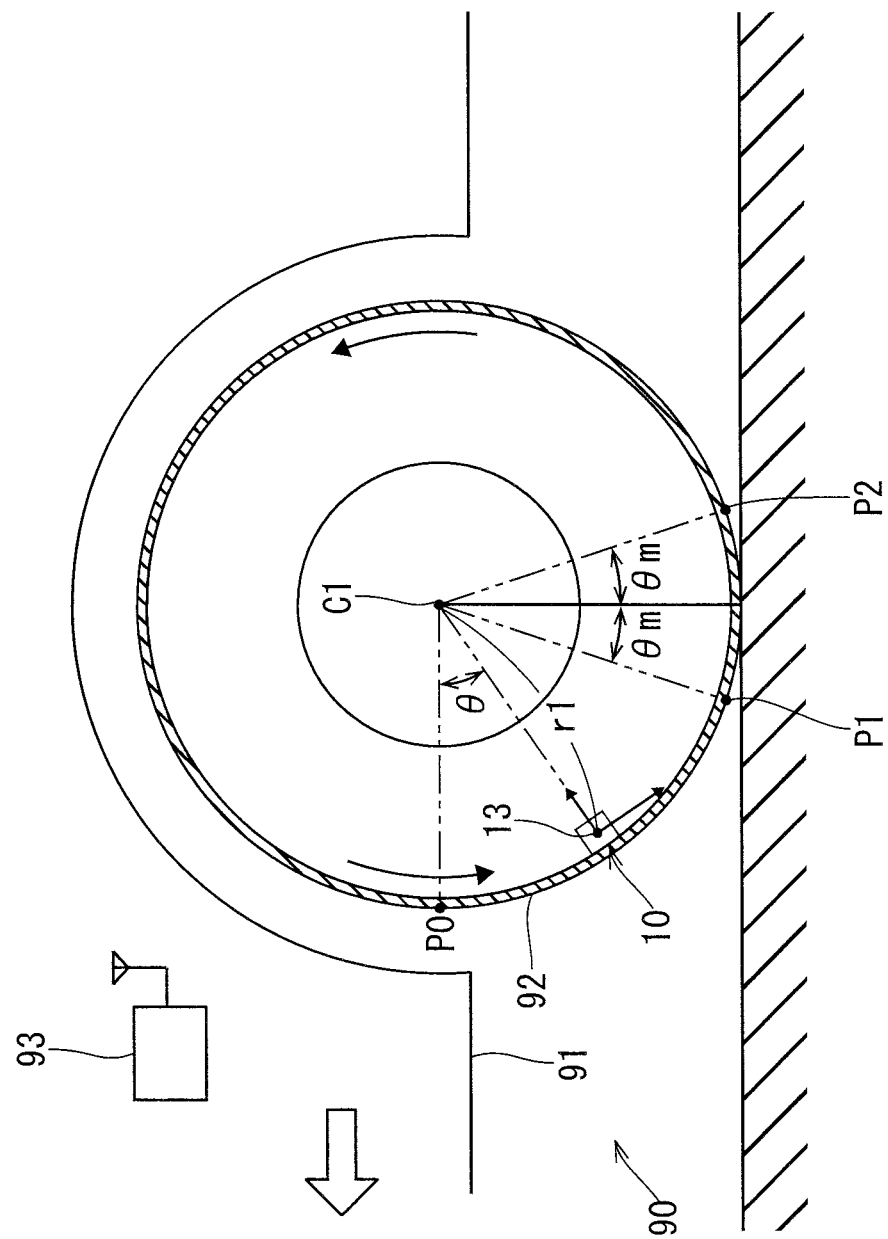
FIG. 2 is a conceptual diagram of a vehicle to which the road surface information collection device is attached.
Figure 3:
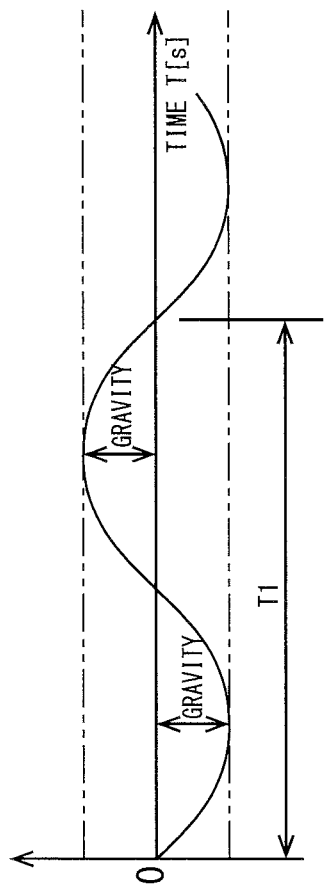
FIG. 3 is a graph showing changes in sensing voltage of an acceleration sensor.
Figure 3:
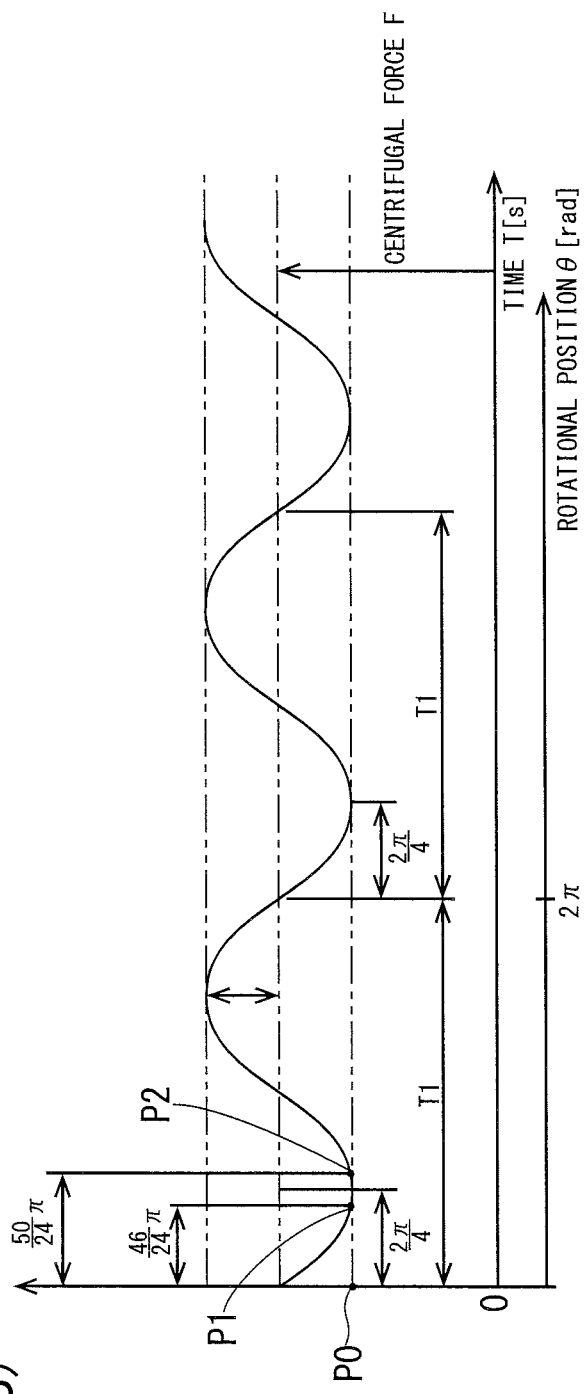

Hereinafter, embodiments of the road surface information collection device 10 will be described with reference to FIG. 1 to FIG. 6. As shown in FIG. 1, the road surface information collection device 10 of the present embodiment includes a plurality of sensors connected to a control circuit 11, as well as a battery 12 as a power source, and is entirely packaged in a resin housing (not shown). As shown in FIG. 2, the road surface information collection device 10 is fixedly attached to an inner circumferential surface of each tire 92 of a vehicle 90, and each road surface information collection device 10 is wirelessly connected to a monitoring device 93 installed in a main body 91 of the vehicle.

As shown in FIG. 1, the control circuit 11 is provided with a power supply circuit 24 that changes the output voltage of the battery 12 as required and supplies the power to various parts. The circuit may include a capacitor as the power source instead of the battery 12. The battery 12 may be a one-way battery, or a rechargeable battery that can be wirelessly charged from outside.

The plurality of sensors mentioned above are made up of an acceleration sensor 13, a pressure sensor 17, and a temperature sensor 18, for example. These sensors are configured such that their resistance varies in accordance with changes in the object of detection, and are energized by the power supply circuit 24 when in use to output a sensing voltage corresponding to the magnitude of each object of detection.

The acceleration sensor 13 is a composite type sensor that includes an X-axis acceleration sensor 14, a Y-axis acceleration sensor 15, and a Z-axis acceleration sensor 16, for example, and can separately detect acceleration in three directions of X-axis, Y-axis, and Z-axis perpendicular to each other. The road surface information collection device 10 is positioned at the center in the width direction of a given circumferential point on the inner circumferential surface of the tire 92, and disposed such that the X-axis acceleration sensor 14 can detect acceleration toward the rotation center C1 of the tire 92, the Y-axis acceleration sensor 15 can detect acceleration in the circumferential velocity direction of the tire 92, and the Z-axis acceleration sensor 16 can detect acceleration in the rotation axis direction of the tire 92.

The control circuit 11 includes a CPU 20, a RAM 20A, and a ROM 20B. The output of the X-axis acceleration sensor 14 is connected to an interrupt terminal of the CPU 20 via an interface 19A. The X-axis acceleration sensor 14 is subjected to a centrifugal force as the vehicle 90 travels, and when its sensing voltage reaches or exceeds a preset reference voltage, this sensing voltage serves as an interrupt signal, so that the CPU 20 performs an interrupt process to execute a startup program (not shown) stored in the ROM 20B.

The power supply circuit 24 does not supply power to various parts other than the X-axis acceleration sensor 14, the interface 19A, and the CPU 20 until the startup program is executed. Power supply to these parts is started as required after the execution of the startup program. Moreover, if the interrupt terminal of the CPU 20 does not receive an interrupt signal for more than a preset time duration, the CPU 20 executes a sleep program (not shown) stored in the ROM 20B, and suspends power supply from the power supply circuit 24 to the parts other than the X-axis acceleration sensor 14, the interface 19A, and the CPU 20.

The control circuit 11 includes first to third A/D converters 21, 22, and 23. The X-axis acceleration sensor 14 is connected to the first A/D converter 21. The X-axis acceleration sensor 14, the Y-axis acceleration sensor 15, and the Z-axis acceleration sensor 16 are connected to the second A/D converter 22. The pressure sensor 17 and the temperature sensor 18 are connected to the third A/D converter 23. An interface 19B is provided between each sensor and the first to third A/D converters 21, 22, and 23, so that the sensing signal from each sensor is amplified as required, with noise removed therefrom, before being taken by the first to third A/D converters 21, 22, and 23. The first to third A/D converters 21, 22, and 23 generate sampling data by sampling the sensing voltage from each sensor and output the sampling data to a buffer 25.

The CPU 20 calculates the rotational position of the acceleration sensor 13 from the sampling data of the output voltage of the X-axis acceleration sensor 14 output from the first A/D converter 21 (hereinafter referred to as "first sampling data") as will be described in detail later. The CPU 20 determines the ON/OFF timing of the second A/D converter 21 based on the calculation results. The CPU 20 also turns on and off the third A/D converter 23 at a timing preset independently of the rotational position of the acceleration sensor 13 and the angular velocity of the tire 92.

The CPU 20 performs an FFT process for example, of the sampling data of the sensing voltage of the acceleration sensor 13 (the X-axis acceleration sensor 14, the Y-axis acceleration sensor 15, and the Z-axis acceleration sensor 16) output from the second A/D converter 22 to the buffer 25 (hereinafter referred to as "second sampling data") to generate spectral data. The CPU 20 then causes the wireless circuit 26 to wirelessly output the spectral data as road surface information. The wireless circuit 26 wirelessly outputs the road surface information with an identification number given to each road surface information collection device 10 to distinguish the road surface information collection devices 10 from one another.

The wireless circuit 26 wirelessly outputs the sampling data of the output voltage of the pressure sensor 17 and temperature sensor 18 output from the third A/D converter 23 to the buffer 25 (hereinafter referred to as "third sampling data") as information on the internal condition of the tire, together with the identification number mentioned above.

To obtain detailed road surface information with the acceleration sensor 13, the detection results of the acceleration sensor 13 need to be sampled multiple times with a short sampling cycle. However, the detection results of the acceleration sensor 13 that are used as the road surface information are only those that are sampled at instants when the acceleration sensor 13 is positioned on the back side of a point on the tire in contact with the ground. Therefore, sampling the acceleration data of the acceleration sensor 13 from all its rotational positions with a short sampling cycle means that much of the consumed power is wasted. As will be described below, the road surface information collection device according to the present embodiment samples the detection results of the acceleration sensor 13 with a first sampling cycle, and a second sampling cycle that is shorter than that. For this purpose, the output voltage of the X-axis acceleration sensor 14 of the acceleration sensor 13 is sampled with two, the first and second, A/D converters 21 and 22. The device is configured such that the rotational position of the acceleration sensor 13 is computed based on changes in the first sampling data obtained by the sampling performed by the first A/D converter 21 with the first sampling cycle, and such that the detection results of the acceleration sensor 13 are sampled by the second A/D converter 22 with the second sampling cycle based on a condition that the acceleration sensor 13 is positioned within a first predetermined range including the back side of a point on the tire in contact with the ground.

More specifically, the first A/D converter 21 samples the output voltage of the X-axis acceleration sensor 14 with an initially set first sampling cycle immediately after the road surface information collection device 10 is started up. When the tire 92 rotates at a very slow constant speed wherein the centrifugal force can be regarded as zero "○", the graph of the first sampling data (vertical axis) over time (horizontal axis) shows a sine wave as shown in FIG. 3(A). The difference between the maximum and minimum peaks of this graph represents the centrifugal force which is in this case obviously zero [0].

As the rotation speed of the tire 92 increases and the centrifugal force F is no longer negligible, the graph shows a pulsating wave as shown in FIG. 3(B), where the sine wave is offset by the centrifugal force F in the vertical axis direction, this offset value corresponding to the centrifugal force F. The CPU 20 uses this graph to determine the centrifugal force F from the first sampling data, and computes an angular velocity ω from this centrifugal force F using common physics formulas. In the ROM 20B are stored constants used for conversion of centrifugal forces F in respective axes of the acceleration sensor 13 into acceleration a toward the rotation center, and rotation radius r1 representing the distance from the rotation center C1 of the tire 92 to the acceleration sensor 13.

If the first A/D converter 21 samples the output voltage of the X-axis acceleration sensor 14 with the same first sampling cycle irrespective of the rotation speed of the tire 92, the number of sampling data acquired during one turn of the tire 92 will vary largely, which will make it difficult to detect the precise rotational position of the road surface information collection device 10 during high-speed rotation, while more sampling data than necessary will be obtained during low-speed rotation and power will be wasted.

In the road surface information collection device 10 of the present embodiment, the CPU 20 executes the control wherein the CPU 20 changes the first sampling cycle of the first A/D converter 21 in accordance with the angular velocity ω of the tire 92. Namely, as shown in FIG. 4, the angular velocity ω of the tire 92 is divided into a plurality of classes, and the first sampling cycle S1 is determined for each of the classes of angular velocity ω such that sampling will be performed in a number of times close to a predetermined reference number of times during one turn of the tire 92 in each class. In the example shown in FIG. 4, the reference number of times is set to 24, and the first sampling cycle S1 is set such that sampling is performed at least 24 times during one turn of the tire 92, in a number of times close to 24.

The second and third rows from the top in FIG. 4 show values of the vehicle speed and the cycle T1 of one rotation of the tire 92 when the tire 92 has an outside diameter of 35 cm, for reference.

Figure 5:
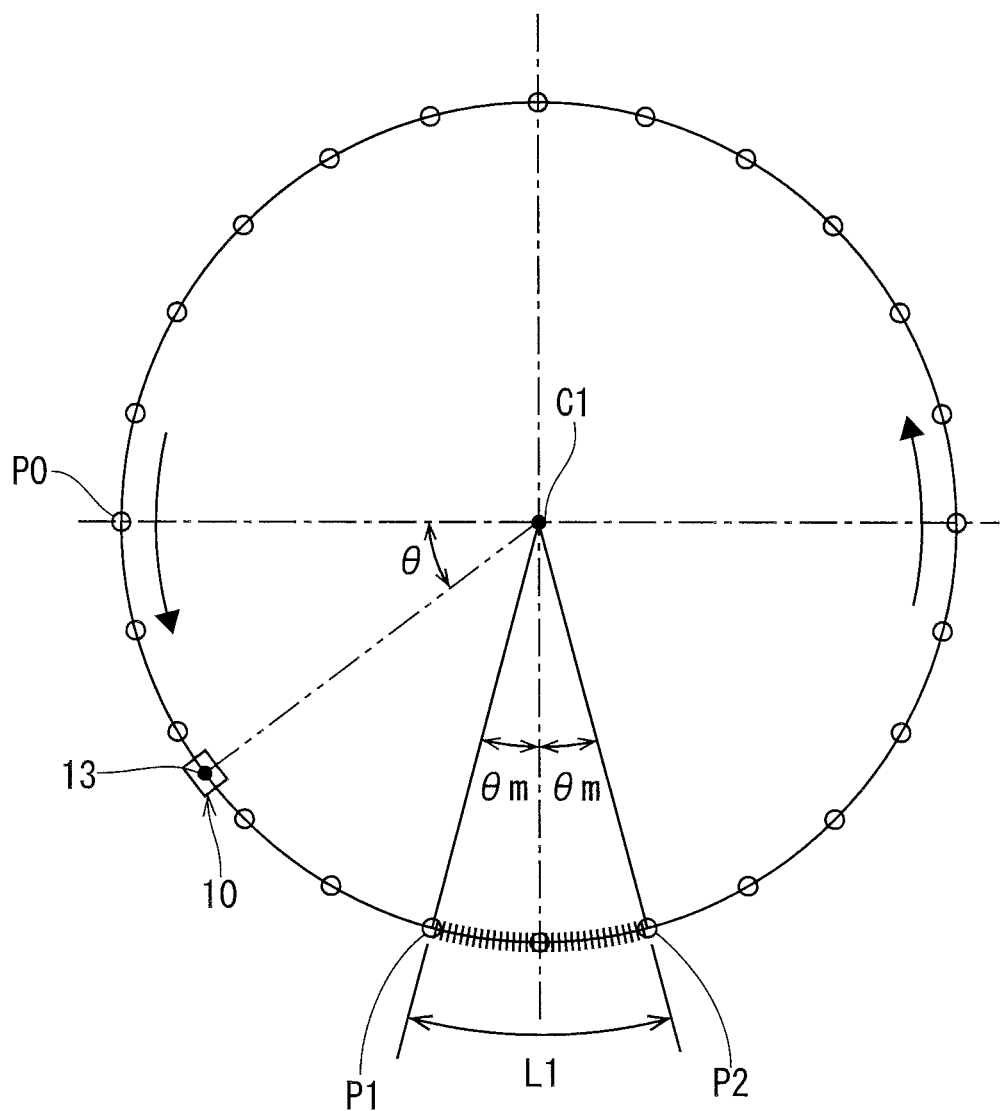
FIG. 5 is a conceptual diagram showing positions where sampling is performed.

FIG. 5 is a conceptual illustration of the circular trajectory R of the acceleration sensor 13 rotating with the tire 92. Examples of positions where the first A/D converter 21 performed sampling are indicated as circles "○" on the circular trajectory R. Sampling is performed in a number of times close to the reference number of times during one turn of the tire 92 in this way so that the first sampling data just enough to detect the rotational position of the acceleration sensor 13 can be obtained.

For example, the CPU 20 calculates the rotational position of the acceleration sensor 13 from the first sampling data in the following manner, wherein a point in front in the horizontal direction of the vehicle 90 relative to the rotation center C1 of the tire 92 is defined as original point P0, and a rotation angle θ in a direction in which the vehicle 90 advances and the tire 92 rotates from this original point P0 (counterclockwise direction in FIG. 2 and FIG. 5) is defined as the rotational position of the acceleration sensor 13. The CPU 20 first determines a centrifugal force F from the first sampling data to calculate an angular velocity ω as mentioned above. The CPU 20 determines a point where the value of the first sampling data that is larger than the centrifugal force F changes to a value smaller than the centrifugal force F as original point P0. The CPU 20 then integrates the angular velocity ω to calculate the rotation angle from the original point P0 as the rotational position of the acceleration sensor 13.

The acceleration sensor 13 comes to position directly at the back of a point on the tire 92 in contact with the ground at a rotational position that is a quarter cycle (i.e., 2π/4) advanced from the original point P0. Rotational positions offset from the rotational position of the acceleration sensor 13 directly at the back of the point on the tire 92 in contact with the ground by a certain margin angle θ m toward the original point P0 side and toward the opposite side are stored in the ROM 20B as a sampling start position P1 and a sampling end position P2. More specifically, the margin angle θ m is set to 2π/24 (=15°) in the present embodiment, for example, so that the sampling start position P1 is at 46π/24 and the sampling end position P2 is at 50π/24.

The CPU 20 turns on the second A/D converter 22 based on a condition that the acceleration sensor 13 is positioned within a first predetermined range L1 between the sampling start position P1 and the sampling end position P2, samples the output voltage of the X-axis acceleration sensor 14, the Y-axis acceleration sensor 15, and the Z-axis acceleration sensor 16 with the second sampling cycle S2, to generate second sampling data and takes it into the buffer 25, as mentioned above. There may be other conditions based on which the second A/D converter 22 is turned on, such as, for example, "the tire 92 having rotated 10 or more turns since sampling was performed by the second A/D converter 22", "the first sampling data having reached or exceeded a reference value", and so on.

The second sampling cycle S2 is set much smaller than the first sampling cycle S1. More specifically, the second sampling cycle S2 is set to a constant value (e.g., of $1.0 \times 10^{-6}$ [s]) such that the number of second sampling data sets is enough to perform an FFT process.

In the lowermost row in FIG. 4 are shown the respective numbers of sample data sets N1 of the X-axis acceleration sensor 14, the Y-axis acceleration sensor 15, and the Z-axis acceleration sensor 16 that can be obtained within the first predetermined range L1 for each class of the angular velocity of the tire 92. FIG. 5 is a conceptual illustration of positions where the second A/D converter 22 performed sampling indicated as vertical bars "|" on the circular trajectory R of the acceleration sensor 13 mentioned above. As shown in this figure, the space between the vertical bars "|" is much shorter than between the circles "○" that indicate the positions where the first A/D converter 21 performed sampling.

Figure 6:
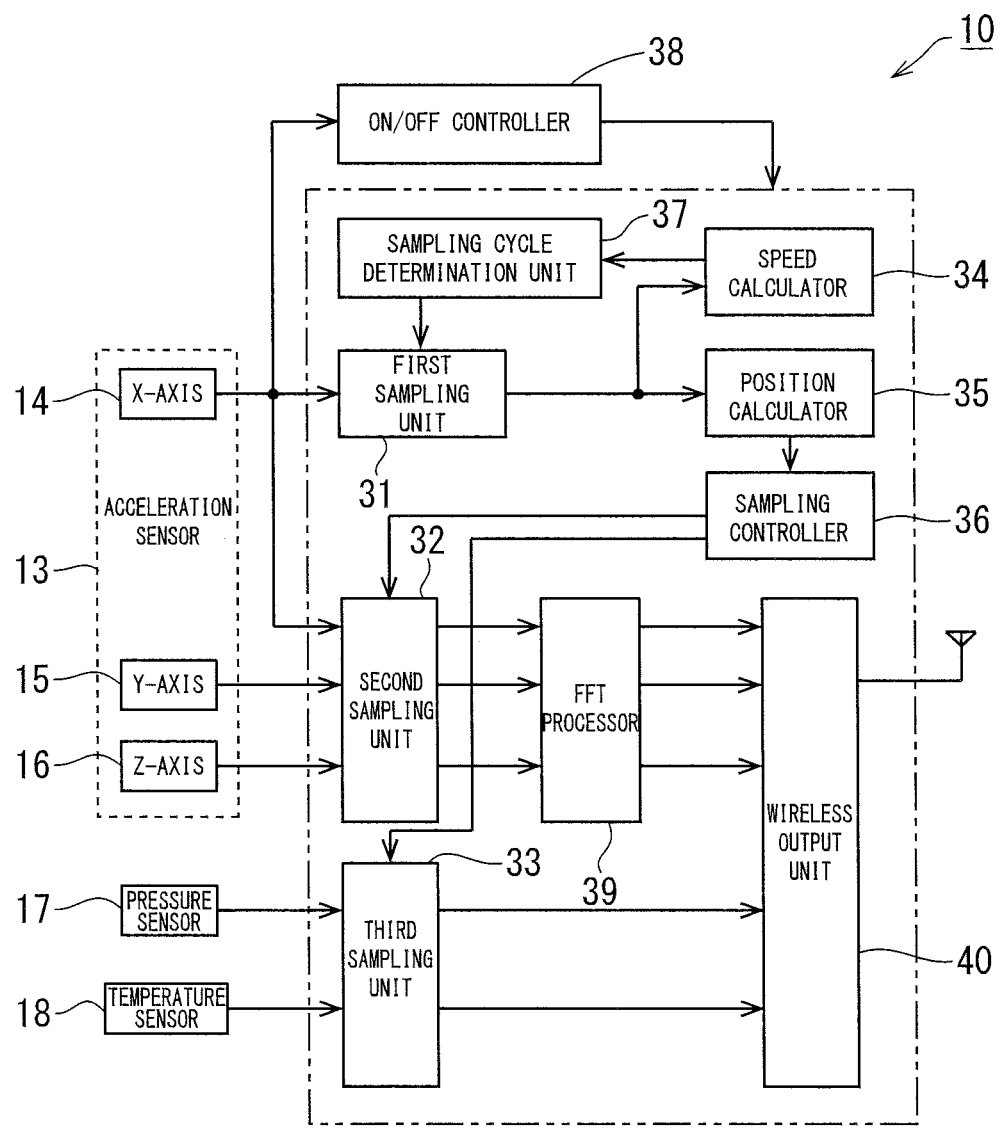
FIG. 6 is a block diagram of the road surface information collection device.

With the CPU 20 performing the control described above, the road surface information collection device 10 as a whole exhibits the functions of the configuration shown in the block diagram of FIG. 6. Namely, an ON/OFF controller 38 in FIG. 6 includes the power supply circuit 24 and the CPU 20 that executes the start-up program and sleep program mentioned above, and controls to turn on and off the power supply to various parts so as to save power. A first sampling unit 31 includes the interfaces 19A and 19B, the first A/D converter 21, and the CPU 20 that controls the first A/D converter 21. A second sampling unit 32 includes the interface 19B, the second A/D converter 22, and the CPU 20 that controls the second A/D converter 22. A third sampling unit 33 includes the interface 19B, the third A/D converter 23, and the CPU 20 that controls the third A/D converter 23.

A speed calculator 34 includes the CPU 20 which is computing the angular velocity ω of the tire 92, and a position calculator 35 includes the CPU 20 when computing the rotational position of the acceleration sensor 13. A sampling controller 36 includes the CPU 20 turning on and off the second A/D converter 22 when the rotational position of the acceleration sensor 13 is at the sampling start position P1 and at the sampling end position P2, and the CPU 20 turning on and off the third A/D converter 23 at a predetermined timing. A sampling cycle determination unit 37 includes, as shown in FIG. 4, a data table of angular velocities ω of the tire 92 in correspondence with the first sampling cycles, and the CPU 20 determining a first sampling cycle from this data table and the angular velocity ω of the tire 92 determined by the speed calculator 34. An FFT processor 39 includes the CPU 20 which is performing an FFT process of the second sampling data, and a wireless output unit 40 includes the wireless circuit 26 and the CPU 20 causing the wireless circuit 26 to transmit data wirelessly.

While some parts of the configuration such as the speed calculator 34 and others in the present embodiment are configured by the CPU 20, which is a general-purpose processor running a start-up program and sleep program, a DSP (Digital Signal Processor) and the like may be provided, or a dedicated circuit such as an ASIC (Application Specific Integrated Circuit) and the like may be provided in place of the general-purpose processor such as the CPU 20. While the start-up program, sleep program, and data table are stored in the ROM 20B in the present embodiment, they may be stored in the RAM or other storage media, or in a combination of various different storage media including RAM and ROM.

The configuration of the road surface information collection device 10 according to the present embodiment is as has been described above. As described above, the road surface information collection device 10 according to the present embodiment samples the acceleration applied to the acceleration sensor 13 with the first sampling cycle S1, and the second sampling cycle S2 that is shorter than that. The rotational position of the acceleration sensor 13 is computed based on changes in the first sampling data obtained by the sampling performed with the first sampling cycle S1, and the detection results of the acceleration sensor 13 are sampled with the second sampling cycle S2 based on a condition that the acceleration sensor 13 is positioned within the first predetermined range L1 including the back side of a point on the tire 92 in contact with the ground to obtain the second sampling data. This reduces the number of wasted sampling, which in turn reduces power consumption. The road surface information and the information on the internal condition of the tire are collected also based on a condition that the tire 92 is rotating and not stopping, so that power consumption can be reduced in this regard too. Moreover, the acceleration sensor 13 for acquiring road surface information is used also for detecting the rotational position of the acceleration sensor 13, so that efficient use of the acceleration sensor 13 and size reduction of the road surface information collection device 10 are both achieved. Since the acceleration sensor 13 detects acceleration in a plurality of directions, detailed road surface information can be collected. Moreover, the information on the internal condition of the tire, based on the pressure inside the tire 92, is collected together with the road surface information. Therefore, the road surface condition can be precisely analyzed in consideration of the internal condition of the tire when the detection results of the acceleration sensor 13 are possibly affected by the tire pressure or the temperature inside the tire.

Second Embodiment

Figure 7:
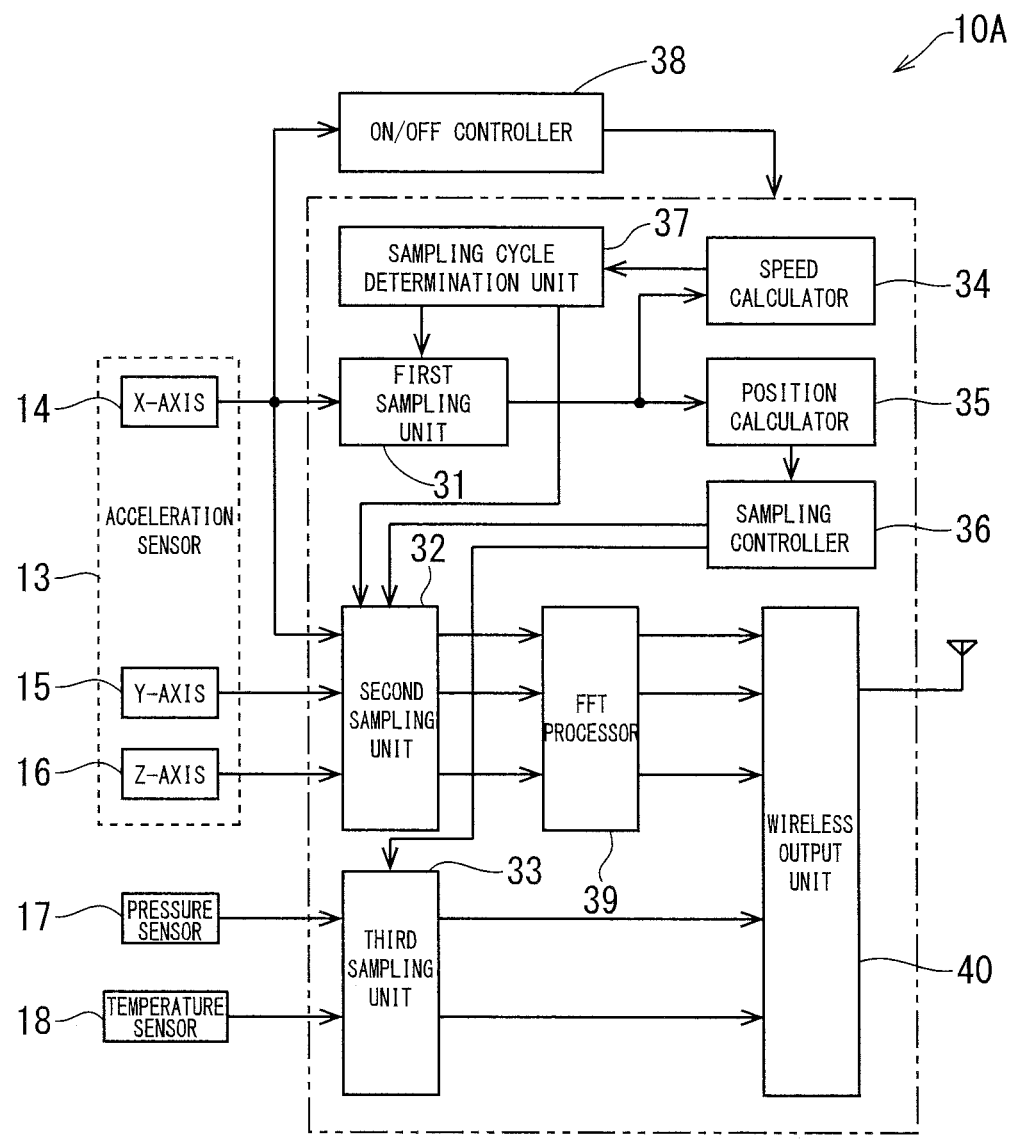
FIG. 7 is a block diagram of a road surface information collection device of a second embodiment.

This embodiment is shown in FIG. 7 and FIG. 8. The road surface information collection device 10A of this embodiment differs from the first embodiment in that the sampling cycle determination unit 37 changes both of the first and second sampling cycles S1 and S2 in accordance with the angular velocity ω of the tire 92. More specifically, the second sampling cycle S2 is arranged to be decreased as the angular velocity ω of the tire 92 is increased, as shown in FIG. 8. As shown in the lowermost row of the table, this prevents a large decrease in the number of sample data sets N1 obtainable within the first predetermined range L1 as the angular velocity ω of the tire 92 increases.

Third Embodiment

Figure 9:
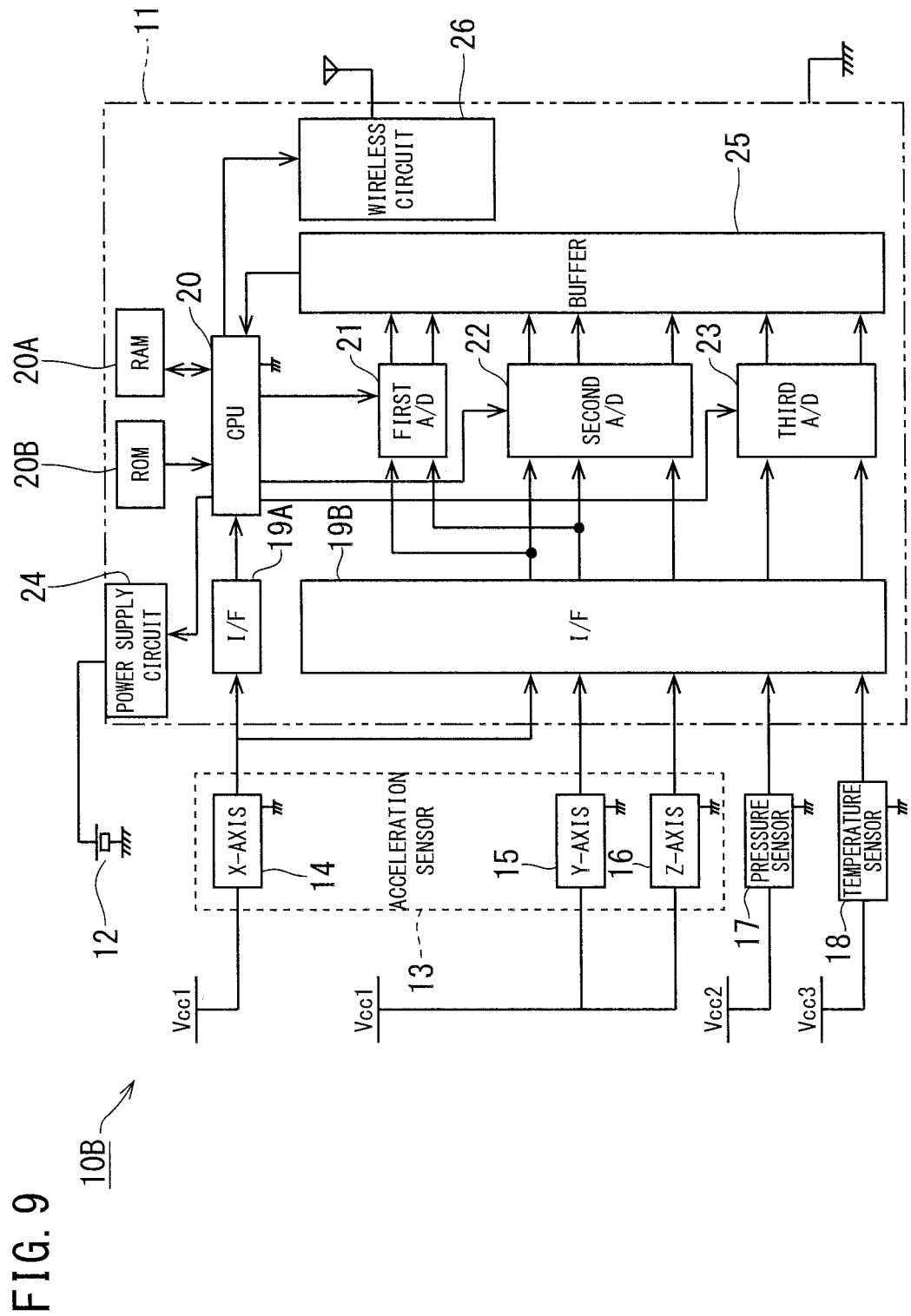
FIG. 9 is a circuit diagram of a road surface information collection device of a third embodiment.

This embodiment is shown in FIG. 9 and FIG. 10. In the road surface information collection device 10B of this embodiment, the first A/D converter 21 samples the sensing voltages of both the X-axis acceleration sensor 14 and the Y-axis acceleration sensor 15 with the same first sampling cycle S1.

As shown by a comparison between FIG. 10(A) and FIG. 10(B), the graphs based on the first sampling data sets of the Y-axis acceleration sensor 15 and the X-axis acceleration sensor 14 sampled substantially at the same time differ from each other, the former changing in accordance with the rotational position of the acceleration sensor 13 without being affected by the centrifugal force. Therefore, in this embodiment, the rotational position of the acceleration sensor 13 is detected based on the first sampling data of the Y-axis acceleration sensor 15 when the CPU 20 is functioning as the position calculator 35 (see FIG. 6).

More specifically, the ROM 20B stores a data table of sensing voltages of the Y-axis acceleration sensor 15 in correspondence with the rotational positions of the acceleration sensor 13. This data table separately stores the rotational positions of the acceleration sensor 13 with corresponding sensing voltages of the Y-axis acceleration sensor 15 when the voltage is decreasing, and the rotational positions of the acceleration sensor 13 with corresponding sensing voltages of the Y-axis acceleration sensor 15 when the voltage is increasing. The CPU 20 calculates a differential value of the first sampling data of the sensing voltage of the Y-axis acceleration sensor 15 to determine if the voltage is decreasing or increasing, before determining the rotational position of the acceleration sensor 13 from the corresponding value of the sensing voltage of the Y-axis acceleration sensor 15 based on the data table.

In an alternative configuration, the rotational position of the acceleration sensor 13 may be calculated from the first sampling data of the sensing voltage of the X-axis acceleration sensor 14, too, as in the first embodiment, and when the rotational position of the acceleration sensor 13 calculated from the first sampling data of the sensing voltage of the X-axis acceleration sensor 14 matches the rotational position of the acceleration sensor 13 calculated from the first sampling data of the sensing voltage of the Y-axis acceleration sensor 15 within a preset tolerable range, one of the rotational positions may be adopted and used. Alternatively, the original point P0 alone may be determined based on the sensing voltage of the Y-axis acceleration sensor 15, while the rotation angle from the original point P0 may be determined by integration of the sensing voltage of the X-axis acceleration sensor 14.

Fourth Embodiment

Figure 11:
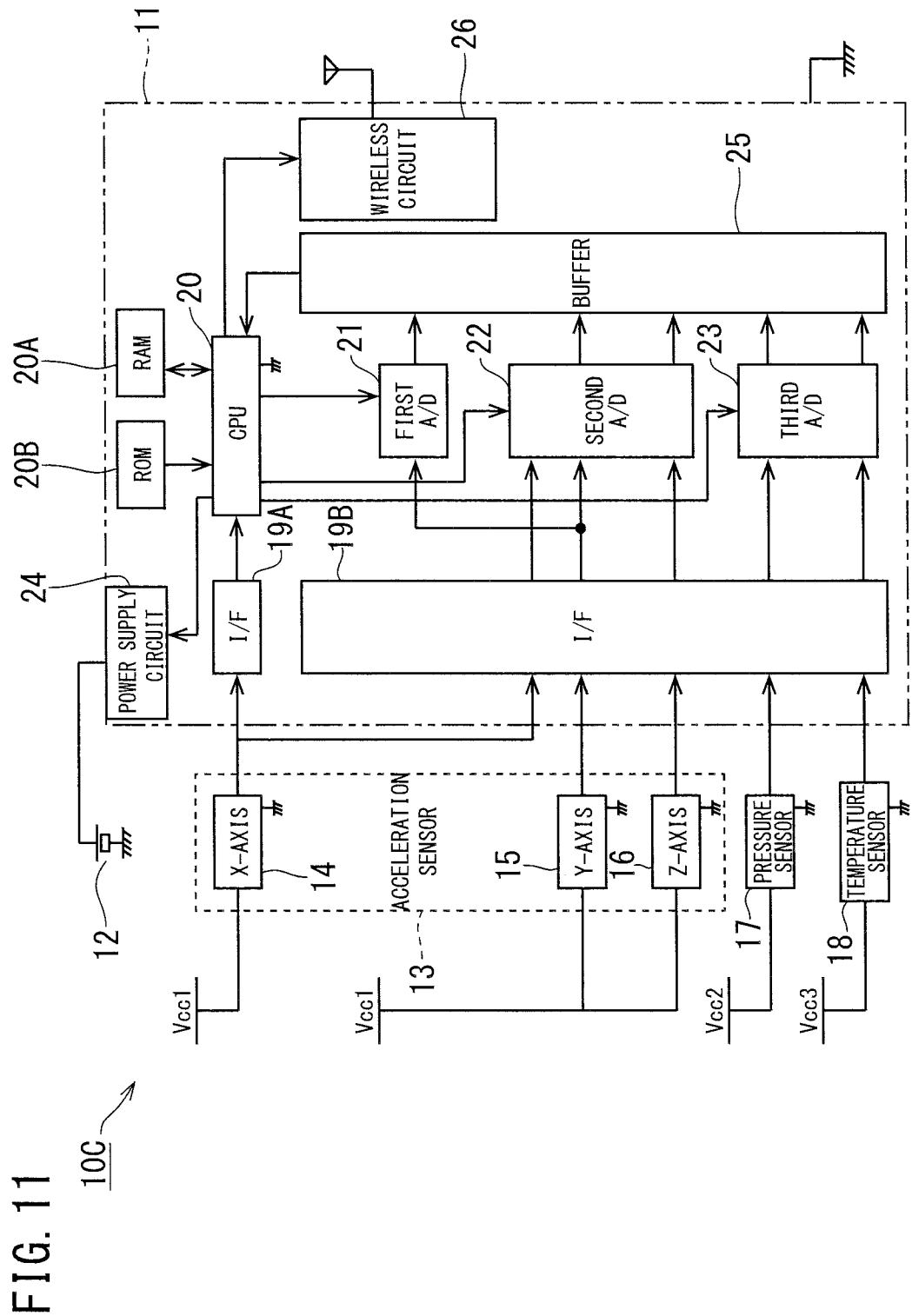
FIG. 11 is a circuit diagram of a road surface information collection device of a fourth embodiment.

In the road surface information collection device 10C of this embodiment, as shown in FIG. 11, the first A/D converter 21 samples the sensing voltage only of the Y-axis acceleration sensor 15. Similarly to the third embodiment, the rotational position of the acceleration sensor 13 is detected based on the first sampling data of the Y-axis acceleration sensor 15 when the CPU 20 is functioning as the position calculator 35 (see FIG. 6). The CPU 20 does not function as the speed calculator 34, and the sampling cycle determination unit 37 (see FIG. 6). The first sampling cycle holds a constant value.

Fifth Embodiment

Figure 12:
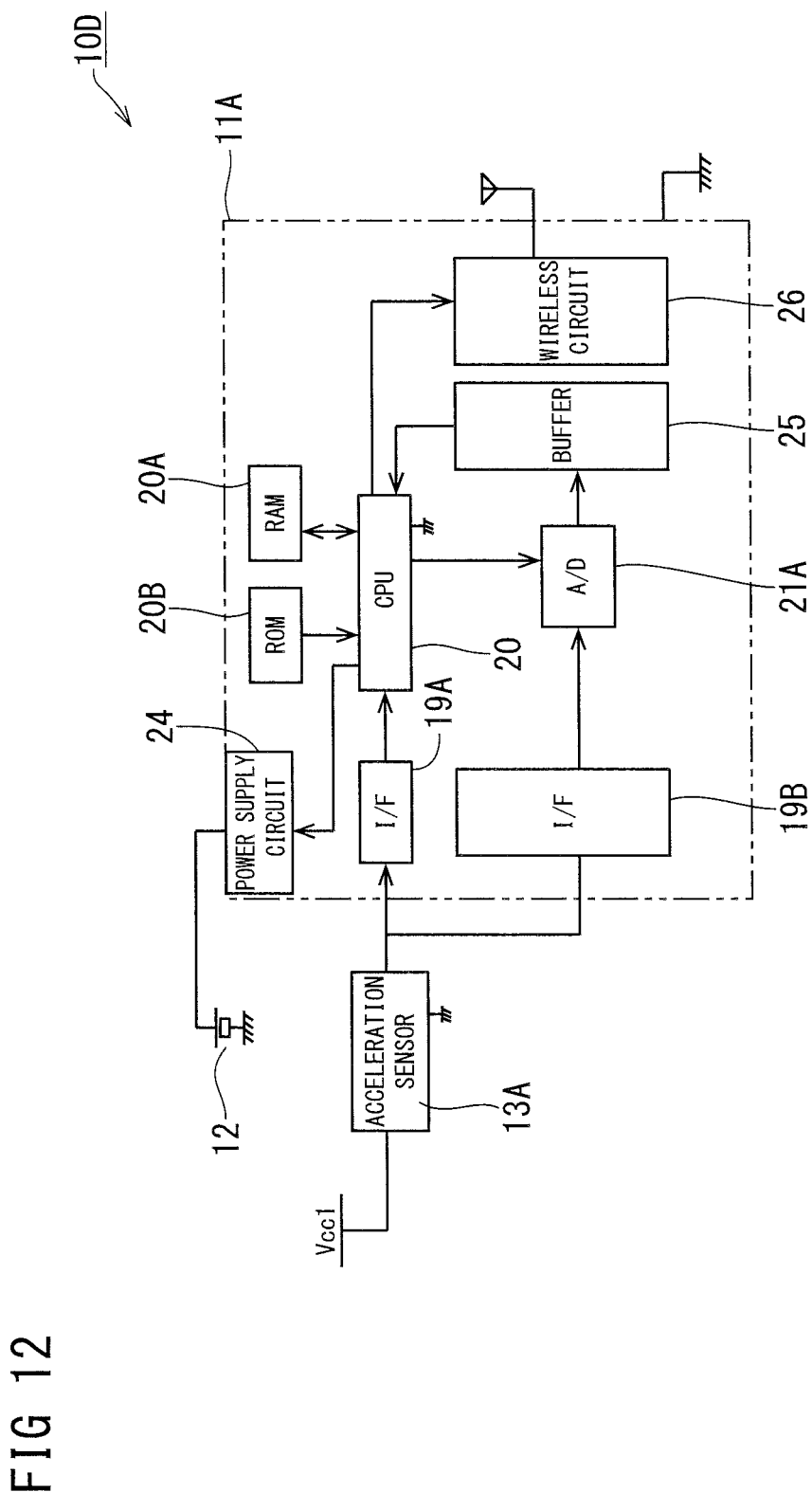
FIG. 12 is a circuit diagram of a road surface information collection device of a fifth embodiment.
Figure 13:
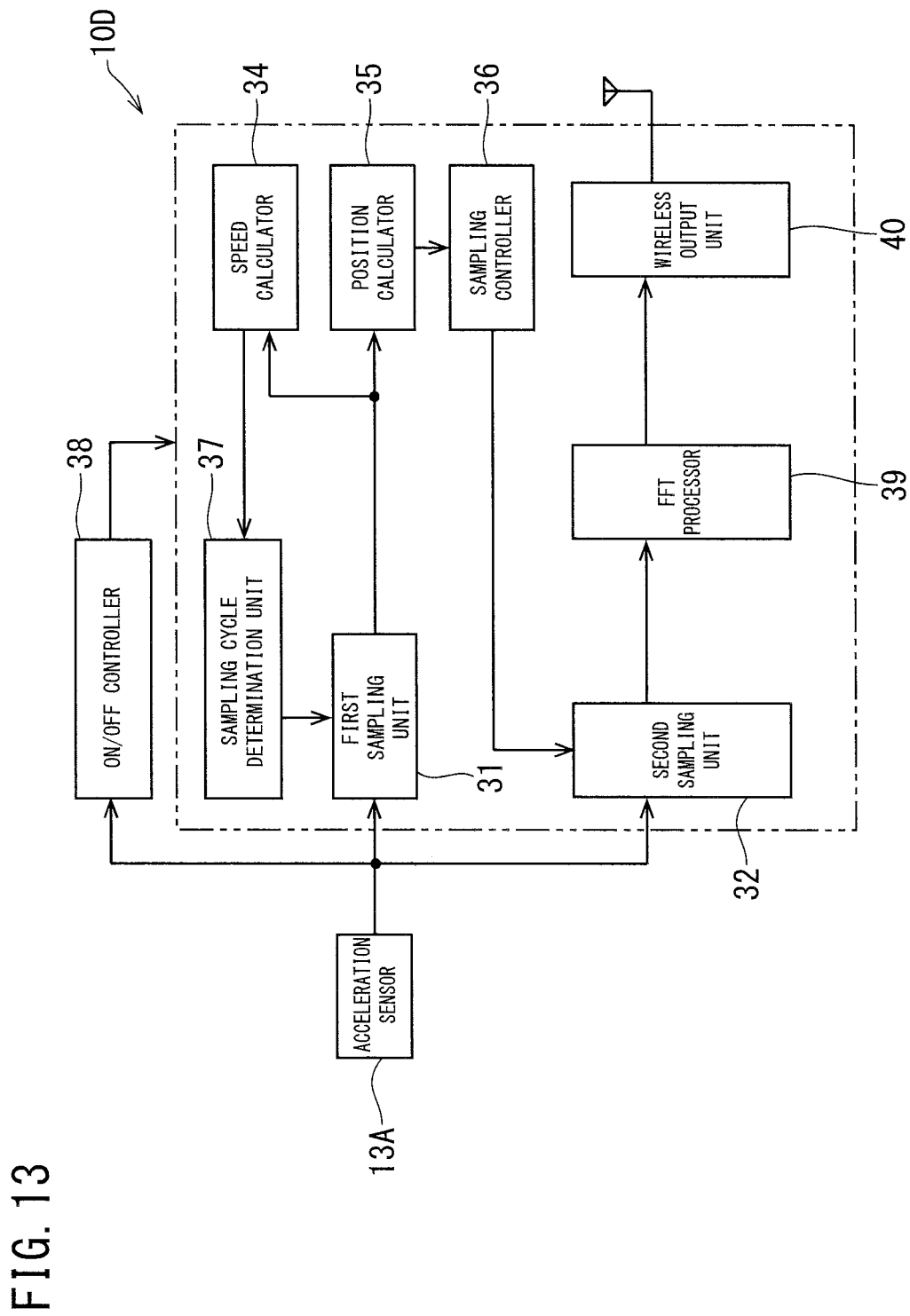
FIG. 13 is a block diagram of the road surface information collection device.

This embodiment is shown in FIG. 12 and FIG. 13. The acceleration sensor 13 of the road surface information collection device 10D of this embodiment is configured to include only the X-axis acceleration sensor 14 described above so that it detects acceleration only toward the rotation center C1 of the tire 92. In this road surface information collection device 10D, the CPU 20 is configured to switch the sampling cycle of one A/D converter 21A between the first sampling cycle S1 and the second sampling cycle S2 so that sampling is performed frequently with the second sampling cycle S2 within the first predetermined range L1 as shown in FIG. 5, while sampling is performed less frequently with the first sampling cycle S1 in other areas than the first predetermined range L1. Namely, in this embodiment, the first sampling unit 31 shown in the block diagram of FIG. 13 includes the A/D converter 21A that performs sampling with the first sampling cycle S1 and the CPU 20 that controls the A/D converter, while the second sampling unit 32 includes the A/D converter 21A that performs sampling with the second sampling cycle S2 and the CPU 20 that controls the A/D converter.

Sixth Embodiment

Figure 14:
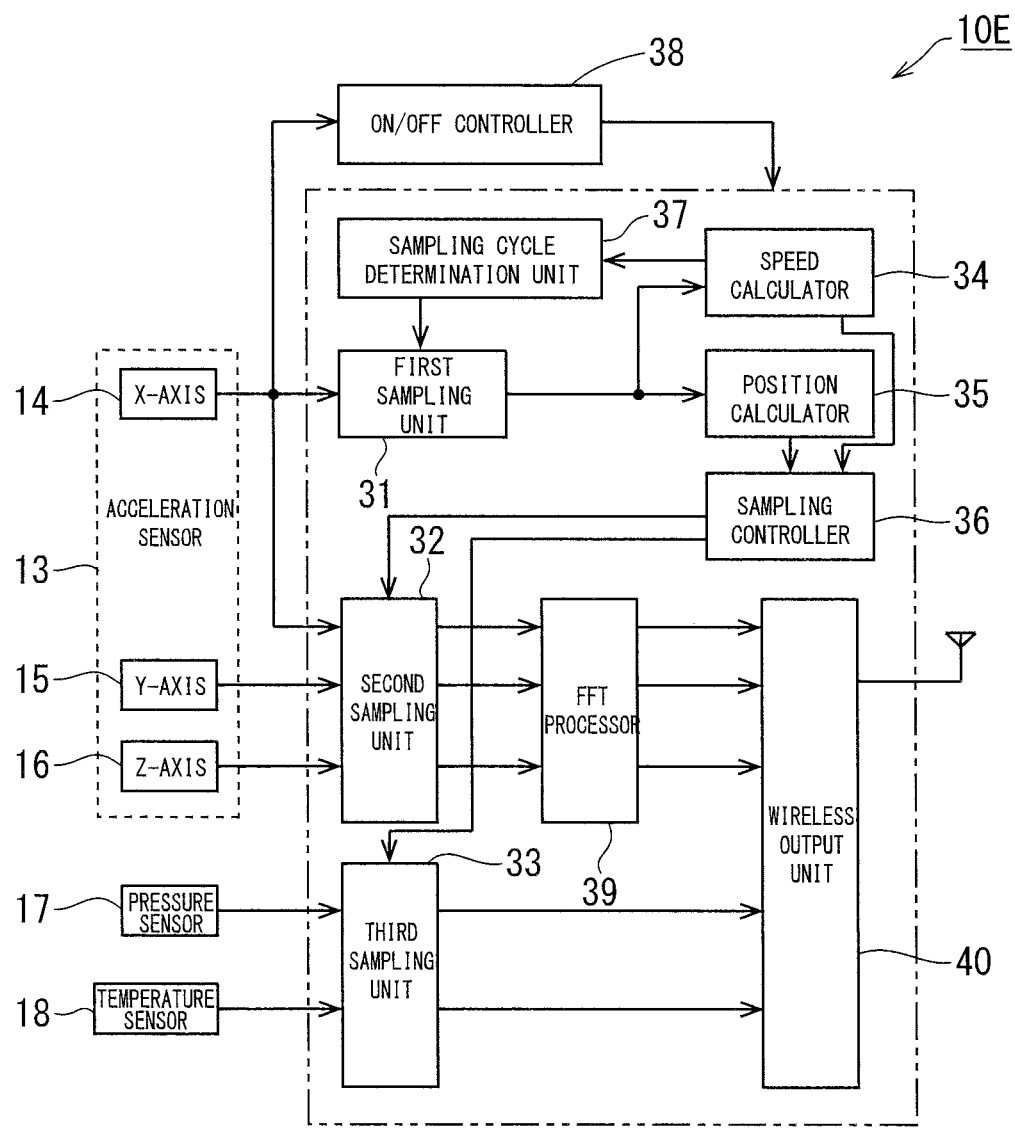
FIG. 14 is a block diagram of a road surface information collection device of a sixth embodiment.

This embodiment is shown in FIG. 14. The road surface information collection device 10E of this embodiment includes a data table that stores correction values differently set for each angular velocity ω of the tire 92. The sampling controller 36 obtains a correction value from the data table based on the angular velocity ω of the tire 92 detected by the speed calculator 34, multiplies the value θ m mentioned above with this correction value to calculate a sampling start position P1 and a sampling end position P2 for each angular velocity ω of the tire 92. This way, the first predetermined range L1 is controlled to be wider as the angular velocity ω of the tire 92 is increased. With this configuration, it is ensured that sampling is performed when the acceleration sensor 13 is positioned at the back side of a point on the tire 92 in contact with the ground even during high-speed drive, and the number of unnecessary sampling during low-speed drive can be reduced. The sampling controller 36 and the data table mentioned above in this embodiment correspond to the "first predetermined range determination unit" in the present disclosure.

Other Embodiments (1) While the embodiments described above have shown a sensor that can detect acceleration in directions of three axes and a sensor that can detect acceleration in a direction along one axis, acceleration sensors that can detect acceleration in directions of two axes may be used, too.

(2) While the road surface information collection device 10 of the embodiments described above includes a pressure sensor 17 and a temperature sensor 18, the device may not include one or both of these sensors.

DESCRIPTION OF THE REFERENCE NUMERAL 10, 10A to 10E Road surface information collection device
12 Battery
13 Acceleration sensor
14 X-axis acceleration sensor
15 Y-axis acceleration sensor
16 Z-axis acceleration sensor
17 Pressure sensor
18 Temperature sensor
21 First A/D converter
22 Second A/D converter
23 Third A/D converter
36 Sampling controller
37 Sampling cycle determination unit
92 Tire
L1 First predetermined range
S1 First sampling cycle
S2 Second sampling cycle
ω Angular velocity

The invention claimed is:

1. A road surface information collection device that collects road surface information with an acceleration sensor attached to an inner circumferential surface of a tire of a vehicle, the device comprising:
a first sampling unit that samples detection results of the acceleration sensor with a first sampling cycle to obtain first sampling data;
a position calculator that calculates a rotational position of the acceleration sensor based on changes in the first sampling data;
a second sampling unit that is activated based on a condition that the acceleration sensor is positioned within a first predetermined range including a back side of a point on the tire in contact with the ground, and that samples detection results of the acceleration sensor with a second sampling cycle shorter than the first sampling cycle to obtain second sampling data as the road surface information;
a speed calculator that detects a rotation speed of the tire based on changes in the first sampling data; and
a first predetermined range determination unit that changes the first predetermined range in accordance with the rotation speed of the tire.

2. The road surface information collection device according to claim 1, wherein
the acceleration sensor has a plurality of sensing axes for detecting acceleration in a plurality of directions, and
the first sampling unit samples acceleration in one direction along one of the sensing axes, while the second sampling unit samples acceleration in the plurality of directions along the plurality of sensing axes.

3. The road surface information collection device according to claim 2, wherein the first sampling unit samples the acceleration either in a radial direction of rotation of the tire or in a direction of circumferential velocity of the tire.

4. The road surface information collection device according to claim 3, wherein the second sampling unit is activated based on a condition that the tire is not being stopped from rotating.

5. The road surface information collection device according to claim 3, further comprising a sampling cycle determination unit that changes the first sampling cycle in accordance with the rotation speed of the tire.

6. The road surface information collection device according to claim 2, wherein the second sampling unit is activated based on a condition that the tire is not being stopped from rotating.

7. The road surface information collection device according to claim 2, further comprising a pressure sensor that detects pressure inside the tire to collect information on an internal condition of the tire based on the pressure inside the tire, together with the road surface information.

8. The road surface information collection device according to claim 7, further comprising a running determination unit that determines whether or not the vehicle is running based on changes in the first sampling data, wherein the information on the internal condition of the tire is collected based on a condition that the vehicle is running.

9. The road surface information collection device according to claim 2, further comprising a sampling cycle determination unit that changes the first sampling cycle in accordance with the rotation speed of the tire.

10. The road surface information collection device according to claim 1, wherein
the acceleration sensor has a plurality of sensing axes for detecting acceleration in a plurality of directions, the first sampling unit samples acceleration in the plurality of directions along all or some of the plurality of sensing axes, the position calculator calculates each rotational position of the acceleration sensor determined based on respective changes in acceleration in the plurality of directions, and the second sampling unit is activated based on a condition that all the rotational positions of the acceleration sensor determined based on the respective changes in acceleration in the plurality of directions are within the first predetermined range, and the second sampling unit samples acceleration in the plurality of directions along all of the plurality of sensing axes.

11. The road surface information collection device according to claim 10, wherein the first sampling unit samples the acceleration in two directions, a radial direction of rotation of the tire and a direction of circumferential velocity of the tire.

12. The road surface information collection device according to claim 11, wherein the second sampling unit is activated based on a condition that the tire is not being stopped from rotating.

13. The road surface information collection device according to claim 10, wherein the second sampling unit is activated based on a condition that the tire is not being stopped from rotating.

14. The road surface information collection device according to claim 10, further comprising a pressure sensor that detects pressure inside the tire to collect information on an internal condition of the tire based on the pressure inside the tire, together with the road surface information.

15. The road surface information collection device according to claim 14, further comprising a running determination unit that determines whether or not the vehicle is running based on changes in the first sampling data, wherein the information on the internal condition of the tire is collected based on a condition that the vehicle is running.

16. The road surface information collection device according to claim 10, further comprising a sampling cycle determination unit that changes the first sampling cycle in accordance with the rotation speed of the tire.

17. The road surface information collection device according to claim 1, wherein the second sampling unit is activated based on a condition that the tire is not being stopped from rotating.

18. The road surface information collection device according to claim 1, further comprising a pressure sensor that detects pressure inside the tire to collect information on an internal condition of the tire based on the pressure inside the tire, together with the road surface information.

19. The road surface information collection device according to claim 18, further comprising a running determination unit that determines whether or not the vehicle is running based on changes in the first sampling data, wherein the information on the internal condition of the tire is collected based on a condition that the vehicle is running.

20. The road surface information collection device according to claim 1, further comprising a sampling cycle determination unit that changes the first sampling cycle in accordance with the rotation speed of the tire.

* * * * *